United States Patent [19]

Shaw et al.

[11] 4,377,243

[45] Mar. 22, 1983

[54] LOCK FOR FUEL TANK COVER

[75] Inventors: Francis Shaw, East Hampton; David W. Jones, East Northport, both of N.Y.

[73] Assignee: Shaw Aero Devices, Inc., East Hampton, N.Y.

[21] Appl. No.: 316,687

[22] Filed: Oct. 30, 1981

[51] Int. Cl.³ ............................................. B65D 55/14
[52] U.S. Cl. .................................. 220/210; 220/293; 220/DIG. 33; 70/167; 70/171
[58] Field of Search .............. 220/210, 246, 251, 260, 220/293, 301, DIG. 33; 70/165, 158, 171, 173, 167

[56] References Cited

U.S. PATENT DOCUMENTS

| | | | |
|---|---|---|---|
| 2,570,818 | 10/1951 | Kirkbride et al. | 220/260 |
| 3,173,570 | 3/1965 | De Pew | 220/301 |
| 3,391,817 | 7/1968 | Shaw | 220/246 |
| 4,028,914 | 6/1977 | Saehe et al. | 220/210 |
| 4,132,091 | 1/1979 | Aro et al. | 220/210 |

*Primary Examiner*—George T. Hall
*Attorney, Agent, or Firm*—Pennie & Edmonds

[57] ABSTRACT

An improved lock for a filler cap having a cover adapted to be received within the tank opening with a retaining member connected at the lower face of the cover for cooperating with the wall of the opening to fasten the cap within the opening; the lock is mounted in the cover and extends downwardly toward the retaining member and the retaining member has cooperating means engagable with the lock when the retaining member is in the fastened position. The lock and the cooperating means prevent movement of the retaining member from the fastened position.

8 Claims, 11 Drawing Figures

LOCK FOR FUEL TANK COVER

TECHNICAL FIELD

This invention relates to a filler cap assembly including a cover for fuel tanks and in particular to a lock for a fuel tank cover.

BACKGROUND ART

In providing filler cap assemblies for vehicle fuel tanks, for example trucks, it is desirable that the cap be manually operable without tools for refueling. The cap must be removed when refueling is necessary and securely refastened and sealed into the tank opening after refueling.

A typical prior art filler cap assembly is disclosed in U.S. Pat. No. 3,391,817. Assemblies of this type include a filler cap having a cover adapted to telescopically seat within a fuel tank opening defined by annular shaped walls. A seal between the cap and the tank opening is effected along the inner peripheral surface of the annular shaped walls.

The filler cap assembly as disclosed in the above-referenced patent comprises a cover with a lower face adapted to be received within the opening of the tank. A retaining member connected to the lower face of the cover cooperates with the walls of the tank opening to fasten the cap within the opening. The lower face is further constructed to prevent rotation of the cover relative to the tank opening.

The upper end of the cover is adapted to face in an outwardly direction. An operating handle is disposed at the upper face of the cover and is connected to the retaining member by an axle. Operation of the handle moves the retaining member between its fastened and unfastened positions with respect to the opening. Seal means are attached to the cover of the cap for sealing engagement with the surrounding tank walls of the opening when the retaining member is in the fastened position.

High fuel costs are encouraging fuel theft. It is often desirable to provide lock means to lock the fastened fuel cap assemblies to fuel tanks. Prior art lock means for the above disclosed caps comprise lock cylinders which lock the operating handle to the cover. Unfortunately such lock means can be circumvented by breaking off the handle with the impact force of a hammer and turning the axle with a pair of pliers to rotate the retaining member to its unfastened position.

SUMMARY OF THE INVENTION

In accordance with the teachings of the present invention there is provided an improved cap lock means which is not readily circumvented by breakage of the cap handle. The lock means is constructed independently of the handle and does not lock the handle.

More particularly, the lock means is mounted in the cover of the cap and cooperates with the underlying retaining member to prevent movement of the retaining member from its fastened position.

DETAILED DESCRIPTION OF THE INVENTION

Figure 1:
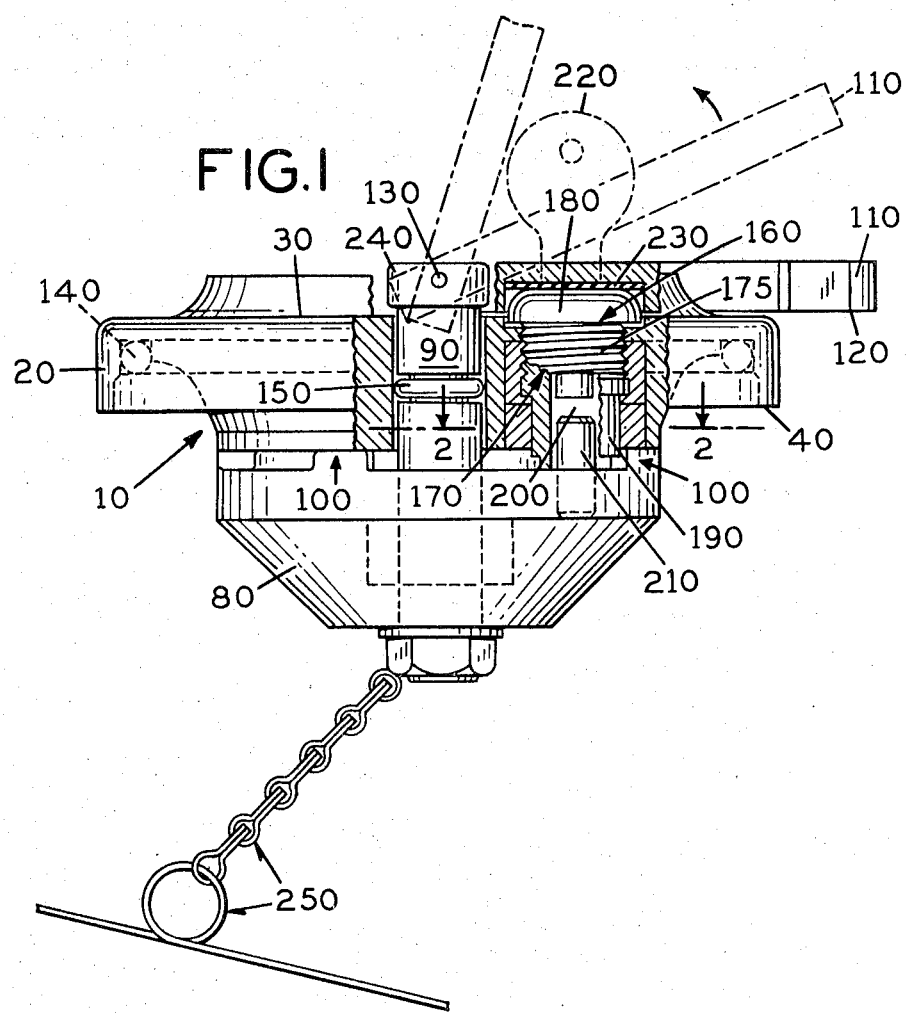
FIG. 1 is a cross-sectional view of the cap assembly of the present invention taken along line 1—1 of FIG. 5.

The filler cap assembly 10 as shown in FIG. 1 has a cover 20 with an outwardly-facing upper face 30 and a lower face 40. The filler cap assembly also has a moving retaining member 80 connected at the lower face 30 of the cover 20 by axle 90.

Figure 5:
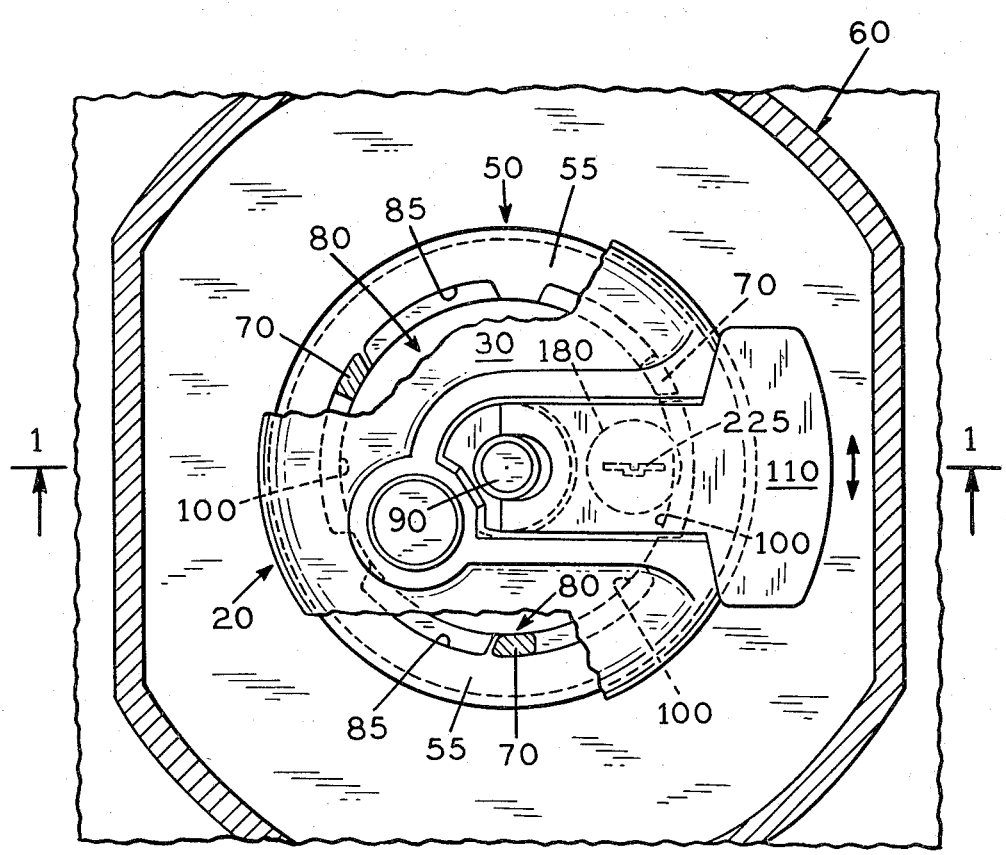
FIG. 5 is a partial cut-away plan view of the cap assembly of the present invention.
Figure 6:
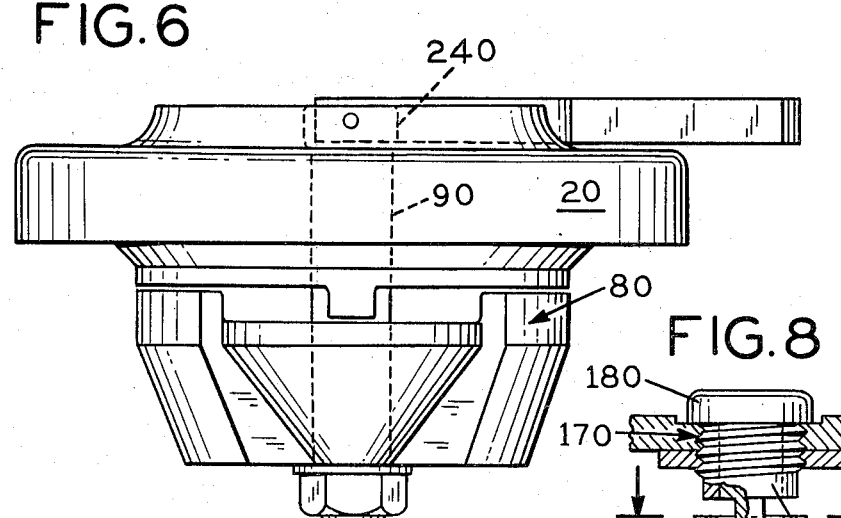
FIG. 6 is an elevational view of an alternate embodiment.
Figure 8:
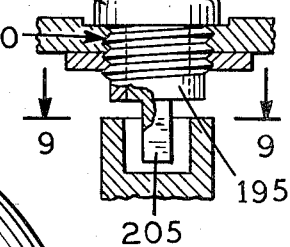
FIG. 8 is a sectional view of an alternate embodiment taken along line 8—8 of FIG. 7.
Figure 7:
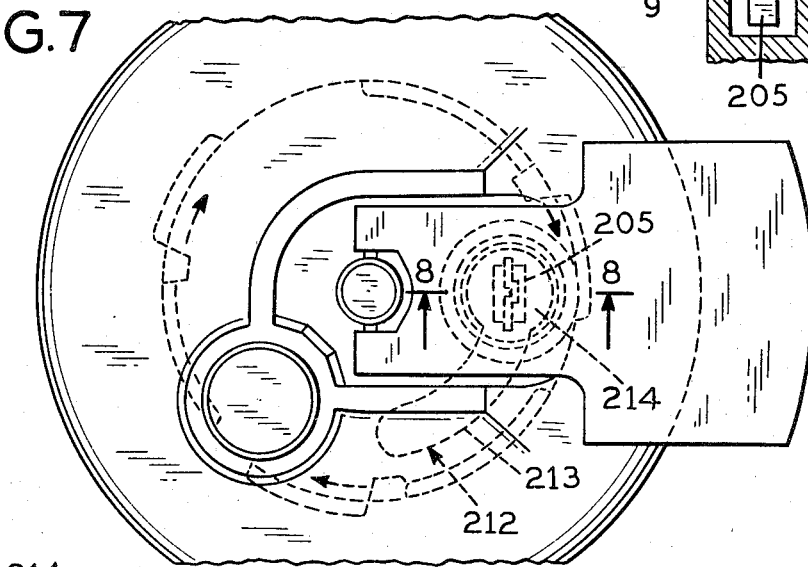
FIG. 7 is a plan view of an alternate embodiment.

The cover 20 is adapted to telescopically seat within an annular-walled opening or neck 50 of the fuel tank 60 to be sealed, FIG. 5. The neck is defined by an annular neck shoulder 55 having spaced, radially outwardly extending neck slots 85. As shown in FIGS. 1 and 5, the retaining member 80 has radial lugs 100 which are telescopically inserted through the neck slots 85 to position the retaining member in an unfastened position within the opening 50. Rotation of the retaining member 80 within the opening 50 engages the lugs under the neck shoulder 55 and positions the retaining member 80 in a fastened position. Other means of cooperation are disclosed in U.S. Pat. No. 3,391,817.

The lower face 40 of the cover also has cover lugs 70 which are complimentary to and engage within the neck slots 85 of the tank opening 50. The cover lugs 70 prevent rotation of the cover 20 within the tank opening 50 by abutting the radial edges of the neck slots 85. A safety chain and stop 250 is attached to the cap to prevent loss of the cap assembly 20 when removed from the opening during refueling of the tank.

Rotation of the retaining member between unfastened and fastened positions is accomplished by an operating handle 110 which has a bottom side 120 facing the upper face 30 of the cover 20, as shown in FIG. 5. The operating handle 110 is connected to the axle 90 by pin 130. The other end of the axle is attached to the retaining member in nonrotative relationship therewith. Lifting and rotation of the handle 110 in turn rotates the retaining member 80 between the unfastened and fastened positions.

Seal means 140 seals the cover 20 to the annular-shaped walls of the tank opening 50 to prevent fuel loss when the cap assembly 10 is fastened in the neck opening. Seal means 150 seals the junction between cover 20 and axle 90 to prevent fuel loss between the cover and axle when the cap assembly 10 fastened in the neck opening 50.

In accordance with the teaching of the present invention, a lock means is provided to lock the retaining member 80 against rotation once it is rotated to its fastened position. The lock means comprises a threaded lock assembly 160 mounted in the cover 20 by threads 175. The lock assembly 160 has a lock cylinder 170 with a top end 180 on the upper face 30 of the cover 20. The lock cylinder 175 extends downwardly towards the retaining member 80.

The lock cylinder 170 is activated by a key 220 which inserts into a key slot 225 on the top end 180 of the cylinder as shown in FIGS. 1 and 5. The lower end of lock cylinder 170 defines a lock base 190 with a slot 200. Activation of the lock cylinder 170 rotates the lock base 190.

The retaining member 80 has cooperating means for engagement by the lock base 190 when the retaining member is in the fastened position to prevent rotation of the retaining member from the fastened position. As shown in FIGS. 1-4, the cooperating means comprises a partially exposed pin 210 connected to the retaining member 80. The pin translates a rotational path as the retaining member rotates between its unfastened to fastened positions. In the fastened position, the pin 210 is received within the slot 200 of the base 190 of the lock cylinder 170. The mode of lock operation is shown diagramatically in FIGS. 2-4.

Figure 2:
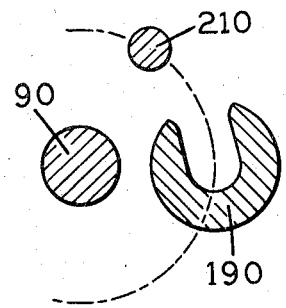
FIG. 2 is a partial diagramatic sectional view taken along line 2—2 of FIG. 1 showing the lock position prior to fastening and locking of the cap assembly.

FIG. 2 shows the retaining member 80 in its unfastened position and the lock base 190 in its unlocked position. With the parts so oriented, the slot 200 of the back base 190 faces the path along which the pin 210 will traverse due to rotation of the retaining member 80 to its fastened position. The handle 110 is in its fully lifted position (FIG. 1) and accessable to effect rotation of the retaining member to its fastened position.

Figure 3:
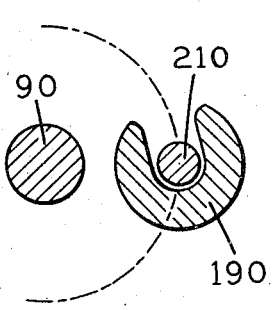
FIG. 3 is a partial diagramatic sectional view similar to that of FIG. 2 showing the lock position after fastening of the cap but prior to locking the cap assembly.

FIG. 3 shows the lock base 190 still in its unlocked position, but the handle 110 and retaining member 80 have been rotated to the fastened position. The pin 210 is now engaged within the base 190 and the handle 110 is still in its lifted position.

Figure 4:
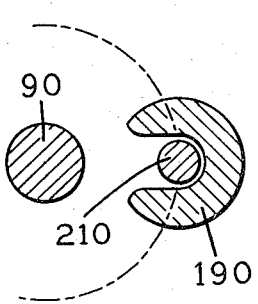
FIG. 4 is a partial diagramatic sectional view similar to that of FIG. 2 showing the lock position after fastening and locking the cap assembly.

FIG. 4 shows the base 190 in its locked position. Locking is accomplished by insertion and rotation of the key 220 into the key slot 225. Rotation of the key 220 rotates the lock base 190 such that the slot 200 is perpendicular to, and blocks the rotational path of movement of the pin 210. Thus, the retaining member 80 is locked against rotation toward its unfastened position.

In an alternative embodiment of the present invention, as shown in FIGS. 6-11, the lock cylinder 170 includes a lock base 195 with a locking pin 205. The pin 205 has a substantially rectangular cross-section. The retaining member 80 cooperating means comprises a slot 212 formed in its upper face. The slot 212 as shown has an arc-like shape for receipt of the locking pin 205 as the retaining member 80 rotates from the unfastened to the fastened positions. For this purpose, the slot has a first portion 213 with width which is greater than the smaller cross-sectional dimension of the locking pin, i.e. greater than the pin width. The slot width is, however, smaller than the greater cross-sectional dimension of the locking pin, i.e. smaller than the pin length. Slot 212 has a larger second portion or cut-out 214 which allows rotation of the pin 205 when the retaining member 80 is in its fastened position. Activation of the lock cylinder 170 by key 220 (not shown) rotates the locking pin 205 to a position perpendicular to slot 212 and blocks rotation of the retaining member 80.

Figure 9:
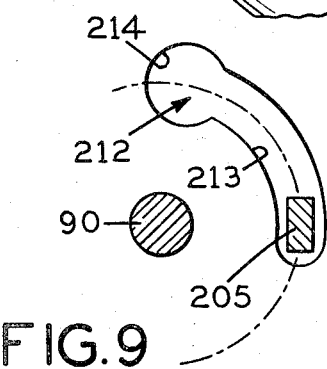
FIG. 9 is a partial diagramatic sectional view taken along line 9—9 of FIG. 8 showing the lock position prior to fastening and locking of the cap assembly.
Figure 10:
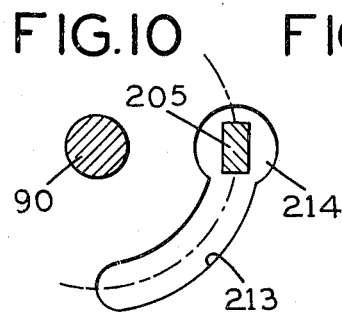
FIG. 10 is a partial diagramatic sectional view similar to that of FIG. 9 showing the lock position after fastening of the cap but prior to locking.
Figure 11:
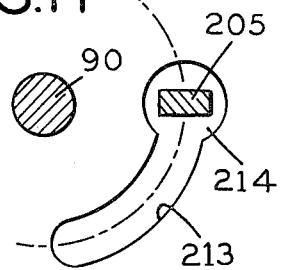
FIG. 11 is a partial diagramatic sectional view similar to that of FIG. 9 showing the lock position after fastening and locking the cap assembly.

The mode of lock operation for the alternate embodiment of the lock construction of the present invention is shown diagramatically in FIGS. 9-11 which correspond to FIGS. 2-4.

In both embodiments of the invention, the handle 110 is lowered to rest on the upper end 30 of the cover 20 after locking the cap assembly and removal of the key. As shown in FIG. 1, the bottom side 120 of the handle 110 covers the lock cylinder top end 180 when it is lowered in the fastened position. The handle bottom side 120 contains a gasket 230 which acts as a weather and moisture shield for the lock. Elimination of moisture and foreign matter from the lock will help to prevent lock jams or malfunctions.

To prevent unauthorized removal of the cap assembly, the axle pin 130 is designed to break under lighter impact stresses than the lock base 190 or pin 210. Therefore it will not be possible to break the lock base or pin by striking the handle. Furthermore, to prevent depression of the axle 90 and retaining member after axle pin 130 breakage, axle collar 240 is disposed on the upper end of axle 90 above the upper face 30 of the cover 20. The axle collar 240 is of a wider diameter than the rest of the axle 90.

We claim:

1. In a filler cap assembly for a tank having an opening defined by a wall, the filler cap having a cover adapted to be received within the opening, a retaining member connected to the lower face of the cover for cooperating with the wall of the opening to fasten and unfasten the cap within the opening, and an operating handle connected to the retaining member for moving the retaining member between unfastened and fastened positions in the opening; the improvement comprising:
   (a) lock means mounted in the cover and extending toward the retaining member; and
   (b) cooperating means on the retaining member for engagement by the lock means when the retaining member is in the fastened position to prevent movement of the retaining member from the fastened position.

2. In a filler cap assembly for a tank having an opening defined by a wall, the filler cap having a cover with a lower face adapted to be received in a non-rotative relationship within the opening, a rotatable retaining member connected to the lower face of the cover for cooperating with the wall of the opening to fasten and unfasten the cap within the opening, an operating handle connected to the retaining member for rotating the retaining member between unfastened and fastened positions in the opening; the improvement comprising:
   (a) lock means mounted in the cover extending downwardly toward the retaining member and movable between an unlocking position and a locking position which blocks the path of rotation of the retaining member, and
   (b) cooperating means on the retaining member for engagement by the lock in its locking position to prevent rotation of the retaining member from the fastened position.

3. The improvement according to claim 2 wherein:
   (a) the lock means comprises a lock cylinder having a slotted rotating base; and
   (b) the cooperating means is rigidly connected to the retaining member for rotational movement therewith from a first position remote from the lock cylinder to a second position located within the slotted base of the lock cylinder as the retaining member rotates between the unfastened to the fastened positions, respectively, whereby activation of the lock cylinder rotates the lock base and blocks rotational movement of said cooperating means.

4. The improvement according to claim 3 wherein the cooperating means is a upwardly extending pin rigidly connected to the retaining member.

5. The improvement according to claim 2 wherein:
   (a) the lock means comprises a lock cylinder having a base forming a downwardly projecting locking pin, the pin having a larger cross-sectional dimension and a smaller cross-sectional dimension; and
   (b) the cooperating means comprises an arctuate slot in the retaining member for rotational movement therewith and receipt of the locking pin as the retaining member rotates between the unfastened and fastened positions, the slot having a first arctuate portion narrower than the larger cross-sectional dimension of the locking pin and a second arctuate portion wider than the larger cross-sectional dimension of the locking pin,
      (i) the first portion receiving the narrower cross-sectional dimension of the locking pin as the retaining member rotates from the unfastened position of the retaining member to the position and
      (ii) the second portion receiving the locking pin when the retaining member is in the fastened position, the second portion permitting rotation of the locking pin upon activation of the lock cylinder to position the larger cross-sectional dimension thereof facing the first portion of said slot so as to block rotational movement of said retaining from the fastened position.

6. The improvement according to claim 5 wherein:
   (a) the locking pin has a substantially retangular cross-section with the larger cross-sectional dimension being its length and the smaller cross-sectional dimension being its width; and
   (b) the first portion of the slot has a width which is greater than the width of the locking pin and smaller than the length and the second portion is a cut-out which is large enough to allow rotation of the locking pin.

7. In a filler cap assembly for a tank having an opening defined by a wall, the filler cap having a cover adapted to be received within the opening, the cover having upper and lower faces, a retaining member for cooperating with the wall of the opening to fasten and unfastened the cap within the opening, an axle connecting the retaining member to the lower face of the cover the axle having an upper end extending upwardly through the upper face of the cover, an operating handle connected to the axle for moving the retaining member between fastened and unfastened positions in the opening; the improvement comprising:
   (a) lock means mounted in the cover and extending downwardly toward the retaining member;
   (b) cooperating means on the retaining member for engagement by the lock when the retaining member is in the fastened position to prevent movement of the retaining member from the fastened position;
   (c) the upper end of the axle having a collar of larger diameter the axle; and
   (d) an axle pin attaching the operating handle to the axle, the pin constructed to break under lighter impact forces than the lock means or the retaining member cooperating means.

8. In the filler cap assembly of claim 7 wherein the operating handle has a bottom side next to the top face of the cover, the improvement wherein:
   (a) the lock means has a top end on the upper face of the cover under the operating handle when said operating handle is in its fastened positions; and
   (c) a gasket attached to the bottom side of the operating handle covering the top end of the lock means when said operating handle is in its fastened position.

* * * * *